US012400623B2

(12) United States Patent
Latos

(10) Patent No.: US 12,400,623 B2
(45) Date of Patent: Aug. 26, 2025

(54) BUTT PLATE DRUM KEY HOLDER AND DRUM KEY

(71) Applicant: Aaron Latos, Newburgh, NY (US)

(72) Inventor: Aaron Latos, Newburgh, NY (US)

( * ) Notice: Subject to any disclaimer, the term of this patent is extended or adjusted under 35 U.S.C. 154(b) by 214 days.

(21) Appl. No.: 18/229,840

(22) Filed: Aug. 3, 2023

(65) Prior Publication Data

US 2025/0046277 A1 Feb. 6, 2025

(51) Int. Cl.
*G10D 13/02* (2020.01)
*G10D 13/16* (2020.01)

(52) U.S. Cl.
CPC ............. *G10D 13/02* (2013.01); *G10D 13/16* (2020.02)

(58) Field of Classification Search
CPC ............................... G10D 13/02; G10D 13/16
See application file for complete search history.

(56) References Cited

U.S. PATENT DOCUMENTS 2,132,105 A * 10/1938 Gladstone ............. G10D 13/02 84/411 R
3,139,783 A 7/1964 Grant et al.
3,276,299 A * 10/1966 Halburian ................ G10D 3/20 81/437
4,208,942 A * 6/1980 Henrit .................... G10D 13/16 984/258
4,903,569 A * 2/1990 Kurosaki ............... G10D 13/16 84/411 R
5,193,418 A 3/1993 Behrenfeld
5,689,076 A * 11/1997 Usuda .................... G10D 13/16 224/269
6,242,680 B1 * 6/2001 Benton, Jr. ............ G10D 13/16 84/411 R
7,034,216 B2 * 4/2006 DiPietro .............. G10D 13/063 84/411 R
7,420,111 B1 9/2008 Lynch et al.
9,934,764 B2 * 4/2018 Jones ..................... G10D 13/16
10,643,588 B1 * 5/2020 Doherty ................. G10D 13/16
11,094,301 B2 8/2021 Strickland
2013/0112064 A1 * 5/2013 Ginter .................... G10D 13/16 84/458
2025/0037686 A1 * 1/2025 Redmon .................. G10D 3/14
2025/0046277 A1 * 2/2025 Latos ..................... G10D 13/16

FOREIGN PATENT DOCUMENTS

DE 20206104 U1 * 9/2002 ............. G10D 13/00

OTHER PUBLICATIONS

First Office Action, including Search Report, for Chinese Patent Application No. 201911326831.7, dated Mar. 18, 2021, 24 pages.

* cited by examiner

*Primary Examiner* — Robert W Horn
(74) *Attorney, Agent, or Firm* — Westman, Champlin, & Koehler PA; Amanda M. Prose

(57) ABSTRACT

A snare drum key holder includes a butt plate for a snare drum. The butt plate includes an opening configured to accept a drum key. The butt plate is configured to attach to a snare drum using existing butt plate mounting openings in the snare drum. A butt plate for a snare drum, the butt plate including a body having a plurality of mounting openings therein, the mounting openings comprising a set of openings configured to match mounting openings in the snare drum. An opening in the body is configured to accept and retain a snare drum key.

20 Claims, 8 Drawing Sheets

BUTT PLATE DRUM KEY HOLDER AND DRUM KEY

BACKGROUND

Musicians playing a snare drum, either by itself (as in an orchestra, concert band, or marching band), or as a component of a drum set, have to make adjustments to their equipment, both while setting up as well as while playing. These adjustments include tuning drums, by adjusting the tension of the heads, replacing heads, and setting up/adjusting accessory stands and hardware. On a modern snare drum and drum set, many of these adjustments use a drum key, which is a small, compact handheld wrench.

The heads of most drum tension rods, which are the bolts that provide tension for the drum head, and much drum hardware features a bolt that will interact with the drum key. The bolt head shape is nearly universally a square-headed bolt, though other formats (round slotted, 12-point, Allen style hex, etc.) do exist.

To complete any of these essential tuning and assembly tasks, the musician, in addition to transporting drums, stands, cymbals, and accessories, also must keep track of a small wrench, which is easily dropped or misplaced. Additionally, while this key is used often during setup and playing, it is also another thing that can be in the way while playing, often rattling if left on a drum's tension rod or falling to the floor and being lost or made inaccessible during vigorous play.

Some drum key holders that are in the vicinity of the drums for which they are to be used have been attached to external areas of snare drums by making additional holes in the drum, and mounting a large mount thereto. This affects the acoustics of the drum. Other drum keys have been attached to throwoffs (or strainers) that are on an opposite side of the drum than the butt plate. Such mounts are necessarily small since the throwoffs do not typically have much area, and accordingly, the snare drum keys that are so mounted are miniature. Miniature drum keys are easily lost or dropped, or provide less leverage than a more standard size key, and are not ideal when working with a drum. Still further drum key holders are mounted to cymbal stands, snare stands, music stands, or the like. Such drum key holders are useless if the drum set being used does not have those components, and further places the drum key in a less accessible and/or less consistent location. Some drum keys are magnetic and stick to components of a drum. This requires the drum to have ferritic components, which many drums do not have. Most or all of these other drum key holders have drawbacks that are all solved by embodiments of the present disclosure, For example, drum keys with a magnet inside the slot, designed to affix to a drum's tension rods to provide storage for a drum key during play do not provide a provision for storing the drum key during transport, while the instrument is in a travel case, and typically only function if a "tension rod" (tensioning bolt) of the drum is manufactured from ferrous, magnetic metal. On a drum with tension rods made of non-magnetic stainless steel, aluminum, brass, or titanium, as is sometimes the case with high-end instruments, this feature loses its functionality. Drum keys with a magnet on the side/body of the key itself or a receptacle to receive the key are problematic in that to stick to a drum itself, the drum must be of ferrous metal construction. The majority of snare drums are not magnetic, being of stainless steel, aluminum, brass, bronze, wood, or composite. If attaching to a stand used in the setup of a drum set or concert snare drum, such stands are typically collapsed and transported together in a single bag, where they abrade and contact against each other, and a lightly-held magnetic fixture is very likely to be dislodged during transport. Drum keys threaded on one end to screw onto a drum set cymbal stand in place of a standard cymbal stand wing nut are problematic in that this is only useful for tuning a drum if a cymbal stand is located in near proximity to the drum to be tuned. This is not always the case in some drummers' drum sets, or in concert/orchestral or marching applications. Further, when the drum key is off the stand, it is not serving its purpose of retaining the cymbal. Holders for a drum key that penetrate the drum shell require permanent modification to the drum shell. Such modifications include, for example, drilling an additional hole or holes into the shell (which is a resonating body) of the drum large enough to accept the holder and key. The hole or holes can negatively affect the acoustical qualities of the drum. Further, many drummers avoid making modifications such as the significant drilling needed to install a component like this, as it requires technical skill and tools. Even if executed well, such modification typically devalues the instrument below that of a drum in a "from the factory" state. Such a mounting also adds additional mass clamped to the shell in the form of the holder, which may further impede full acoustic response and vibration of the instrument.

SUMMARY

A snare drum key holder includes a butt plate for a snare drum. The butt plate includes an opening configured to accept a drum key. The butt plate is configured to attach to a snare drum using existing butt plate mounting openings in the snare drum.

A butt plate for a snare drum, the butt plate including a body having a plurality of mounting openings therein, the mounting openings comprising a set of openings configured to match mounting openings in the snare drum. An opening in the body is configured to accept and retain a snare drum key.

This summary is not intended to describe each disclosed embodiment or every implementation of butt plate drum key holders as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
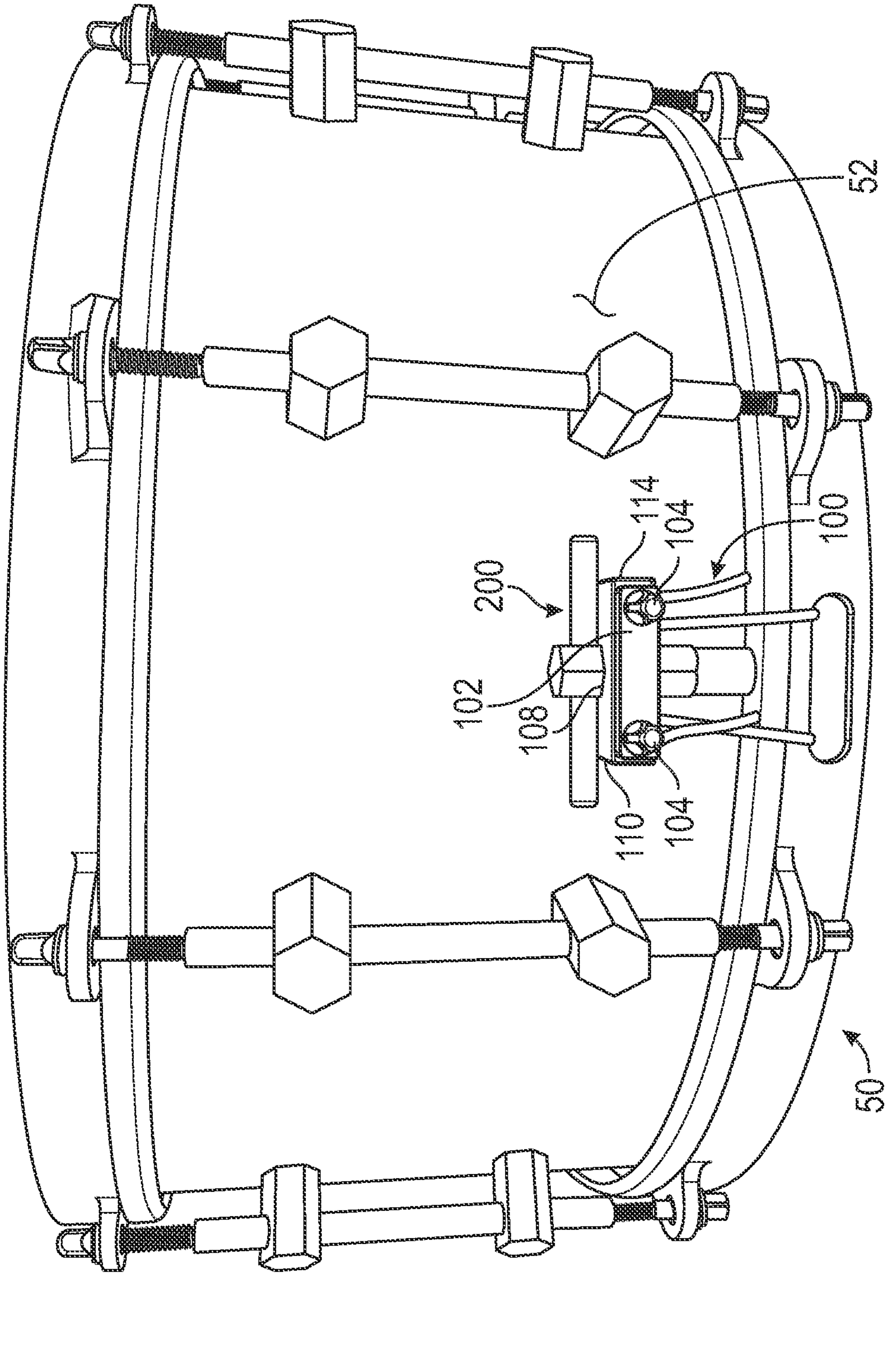
FIG. 1 is a perspective view of a drum key holder and drum key according to an embodiment of the present disclosure, in place on a drum.

In general, embodiments of the present disclosure provide a snare drum key holder incorporated into a butt plate for a snare drum. The butt plate is configured with an opening to accept and retain the drum key.

A drum key holder is provided that does not use any holes not already present in a drum. Instead, the key holder uses existing components, specifically a butt plate, and existing openings in the drum. Embodiments of the key holder place the drum key in an easily accessible location on a drum, and provide a secure holding position that does not rattle, and does not shake loose during storage or drumming. In one embodiment, a key holder is contained in a butt plate for the drum, the drum plate having a key opening therein for retaining a drum key in the drum key opening. The opening is in one embodiment shaped and sized to accommodate a full sized drum key, and to retain the drum key in the butt plate during operation, storage, and transport.

Embodiments of the present disclosure provide a butt plate to replace an existing butt plate, the butt plate having a key opening for accepting and retaining a drum key therein. Alternatively, an opening may be machined or otherwise formed into an existing butt plate, for retrofitting an existing drum. The opening is configured to accommodate a full size drum key, and to retain the drum key therein. A retention component is used in one of a number of various forms to retain the drum key in the opening, and it should be understood that the retention component may vary without departing from the scope of the disclosure. Example retention components include, by way of example only and not by way of limitation, a friction fit, a snapping spring plunger with associated groove or detent, spring steel, threads, a magnet, a cam-based retention device, or the like.

The retention component secures the drum key in the opening without rattling or allowing for movement that would contact and potentially damage the drum or affect the acoustics thereof. The key holder is suitable for retention during use, transport, or storage, yet allows the drum key to be easily accessible and available when needed. The embodiments of the present disclosure retain the drum key so that the drum key does not butt up against the drum body, so that acoustics are not compromised. Still further, the opening may be shaped in order to further keep the drum key from rattling or contacting the drum by shaping the opening with a specific shape, such as but not limited to hexagonal, square, or the like, or by the incorporation of features such as grooves that permit locational registration/alignment. A drum key shape matching the opening shape is used in various embodiments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a front view of a drum 50 on which a butt plate drum key holder 100 according to an embodiment of the present is mounted. A butt plate such as butt plate 100 is used in conjunction with a throwoff or strainer (not shown) and snare wires that are tensioned between the strainer and the butt plate 100 to create the snare drum sound. The butt plate 100 has a drum side edge 101 that is curved to match an exterior side 52 of the drum 50. The butt plate 100 is attached to the drum side 52 using, for example, machine screws or the like. The snare wires are clamped to the butt plate 100 using a clamp 102 and bolts 104, either directly or using a typical industry-standard application of string, cord, metal wire, coated metal cable, plastic straps, grosgrain ribbon, od the like. The bolts 104 thread or otherwise extend through the clamp 102 and into openings 106 (see FIG) in butt plate 100 to retain the clamp 102 to the butt plate 100. A drum key 200 is shown in FIG. 1 inserted into and retained by a drum key opening 108 in the butt plate 100. This opening 108 is in one embodiment provided as a part of a manufactured butt plate 100. Alternatively, an existing butt plate may be modified to add the opening 108 and a retention component opening 112 (see FIGS. 3-5 and 7).

Figure 2:
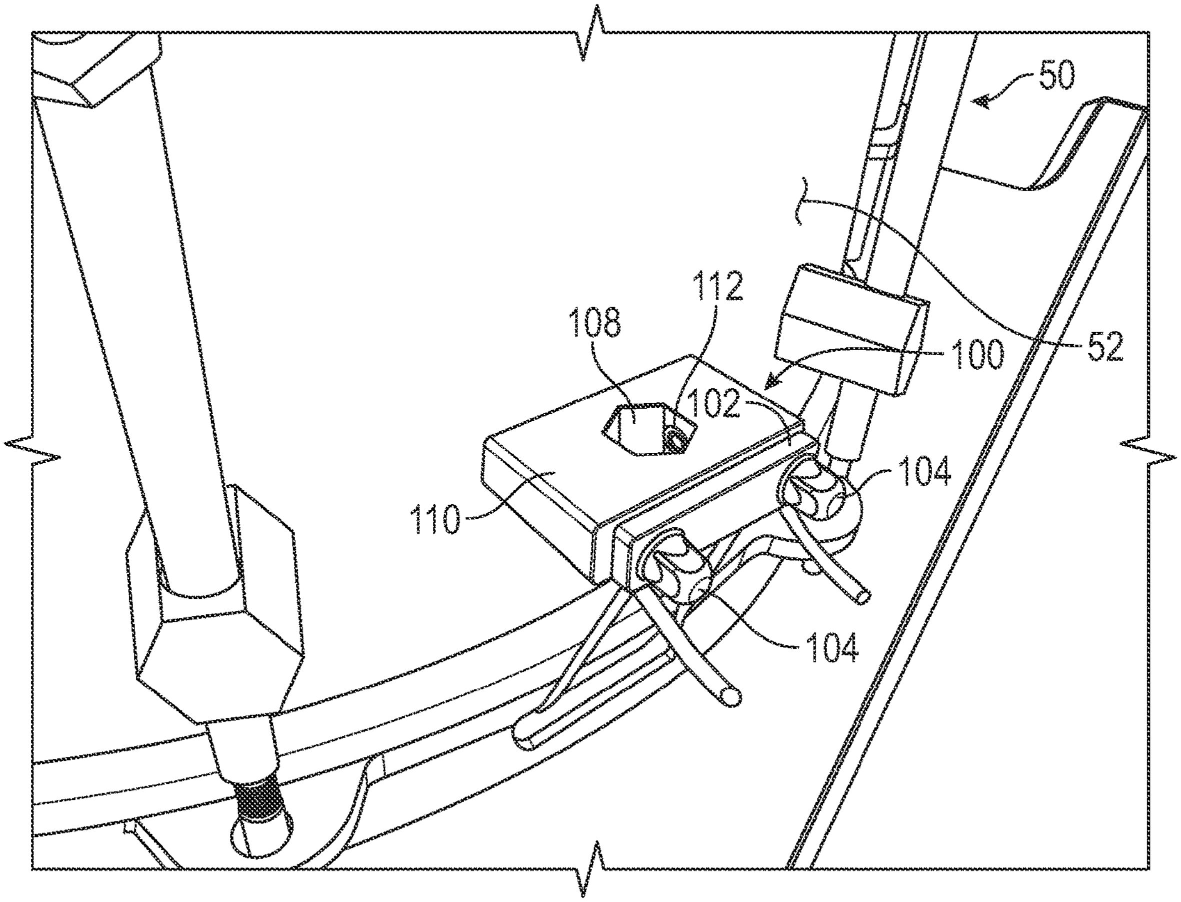
FIG. 2 is a partial perspective view of the drum key holder of FIG. 1.
Figure 3:
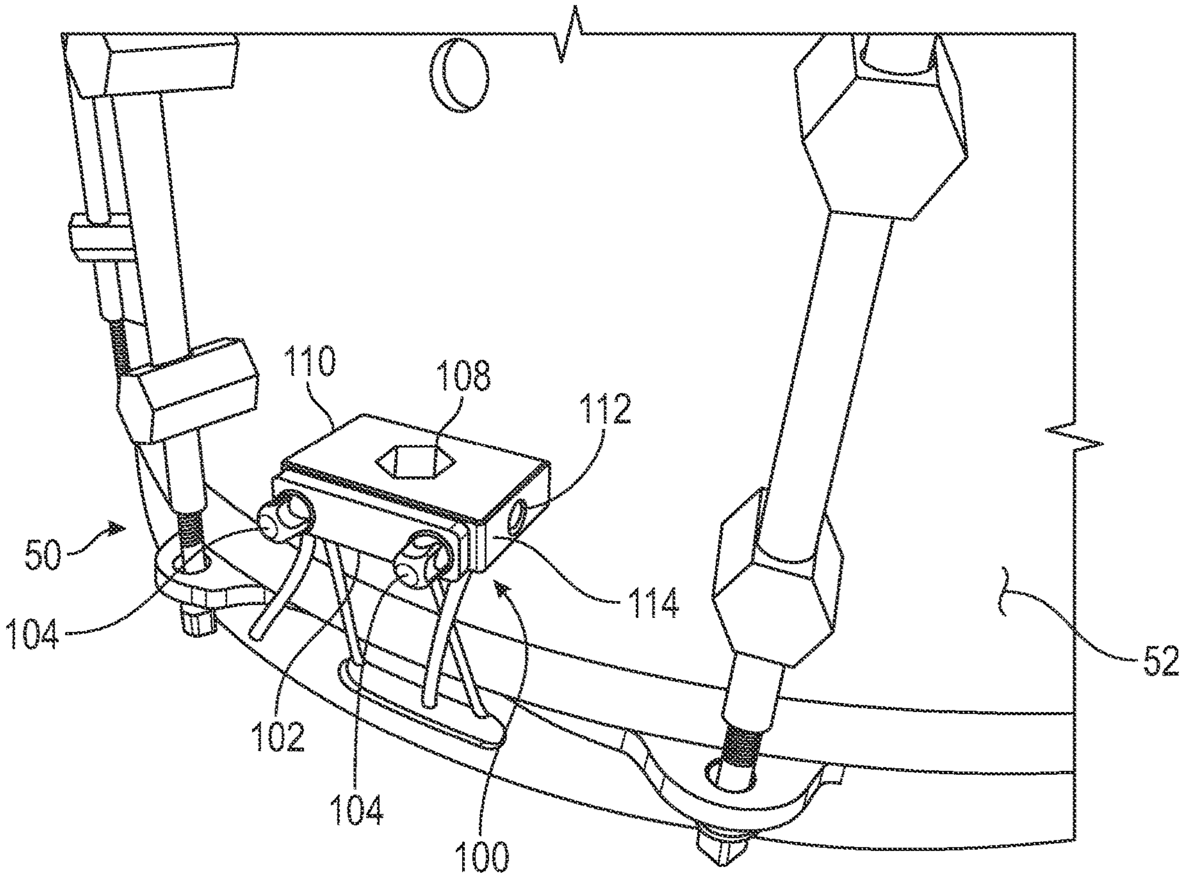
FIG. 3 is a different partial perspective view of the drum key holder of FIG. 1.
Figure 4:
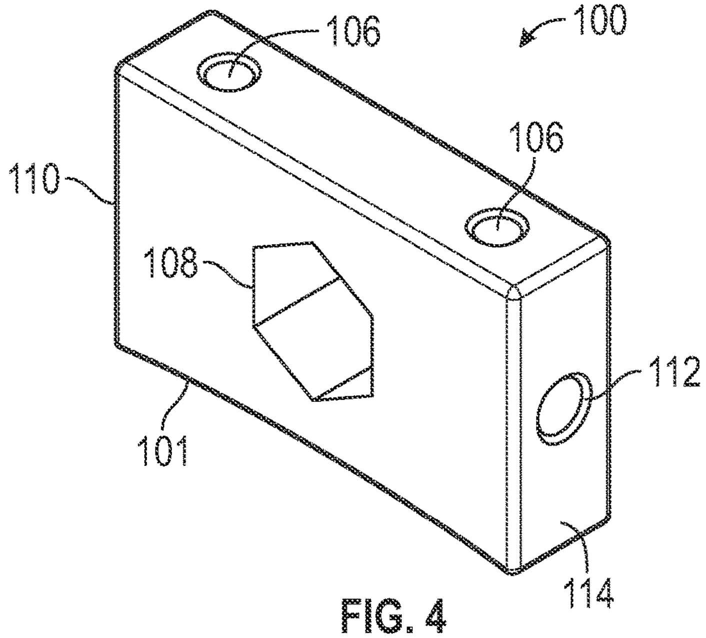
FIG. 4 is perspective view of a drum key holder.
Figure 5:
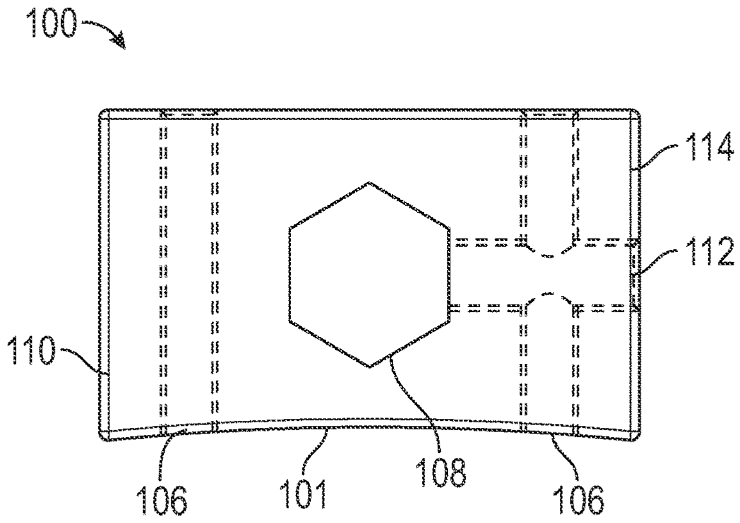
FIG. 5 is a top elevation view of the drum key holder of FIG. 4.
Figure 6:
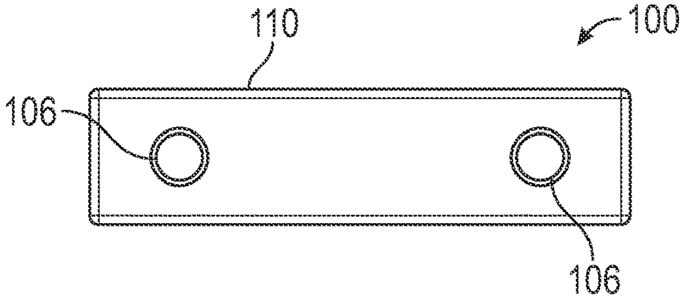
FIG. 6 is a rear elevation view of the drum key holder of FIG. 4.
Figure 7:
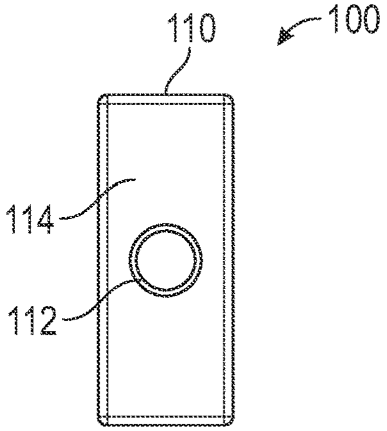
FIG. 7 is a side elevation view of the drum key holder of FIG. 4.

Referring also to FIGS. 2-7, additional views of the butt plate 100 attached to a drum 50 are shown in FIGS. 2-3, and the butt plate 100 is shown in perspective, top, front, and side views in FIGS. 4, 5, 6, and 7, respectively.

Butt plate 100 has a drum side edge 101 that has a curvature designed to match to the exterior side 52 of a drum. Different drums may have different curvatures, and the butt plate 100 edge 101 may be curved appropriately to match a drum such as drum 50. Alternatively, in another embodiment, the butt plate may have a cutaway center portion and only contact the drum shell on the edges, forming a bridge so that multiple diameters of snare drum shells may be accommodated. Openings 106 are used for screws or other fasteners to attach the butt plate 100 to drum 50 in known fashion. The openings 106 extend through the butt plate 100 and also accept bolts 104 to secure clamp 102 to butt plate 100.

Drum key opening 108 extends through the body 110 of butt plate from top to bottom. The drum key opening is configured to accept a drum key such as drum key 200 as shown in FIG. 1. The drum key opening 108 is in one embodiment hexagonally shaped, although it should be understood that the drum key opening 108 may have a different shape without departing from the scope of the disclosure. A retention component 120 (see FIG. 8) may be used in butt plate 100 for assisting in retaining a drum key 200 in butt plate 100. Retention component 120 in one embodiment is threaded or otherwise placed in retention component opening 112 in a side of body 110 of butt plate 100. The retention component opening 112 extends in one embodiment from side edge 114 of the butt plate 100 to opening 108.

Figure 8:
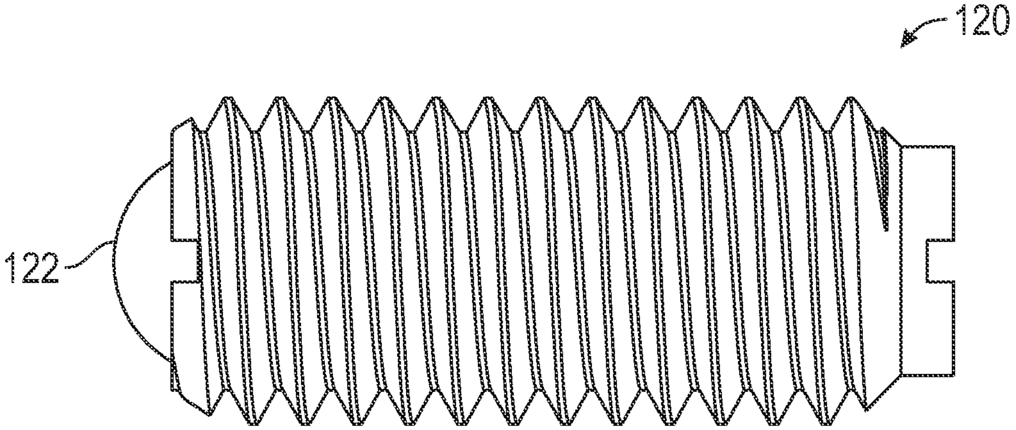
FIG. 8 is a side elevation of a retention component according to an embodiment of the present disclosure.

The retention component in one embodiment is a threaded ball nose spring plunger 120 as shown in FIG. 8. Such a plunger is known and will not be described further herein. The plunger 120 is in one embodiment threaded into opening 112 to extend the ball end 122 into the opening 108, where it will engage a detent, groove, or the like in a drum key 200 to assist in retention of the drum key 200 in opening 108.

Figure 9:
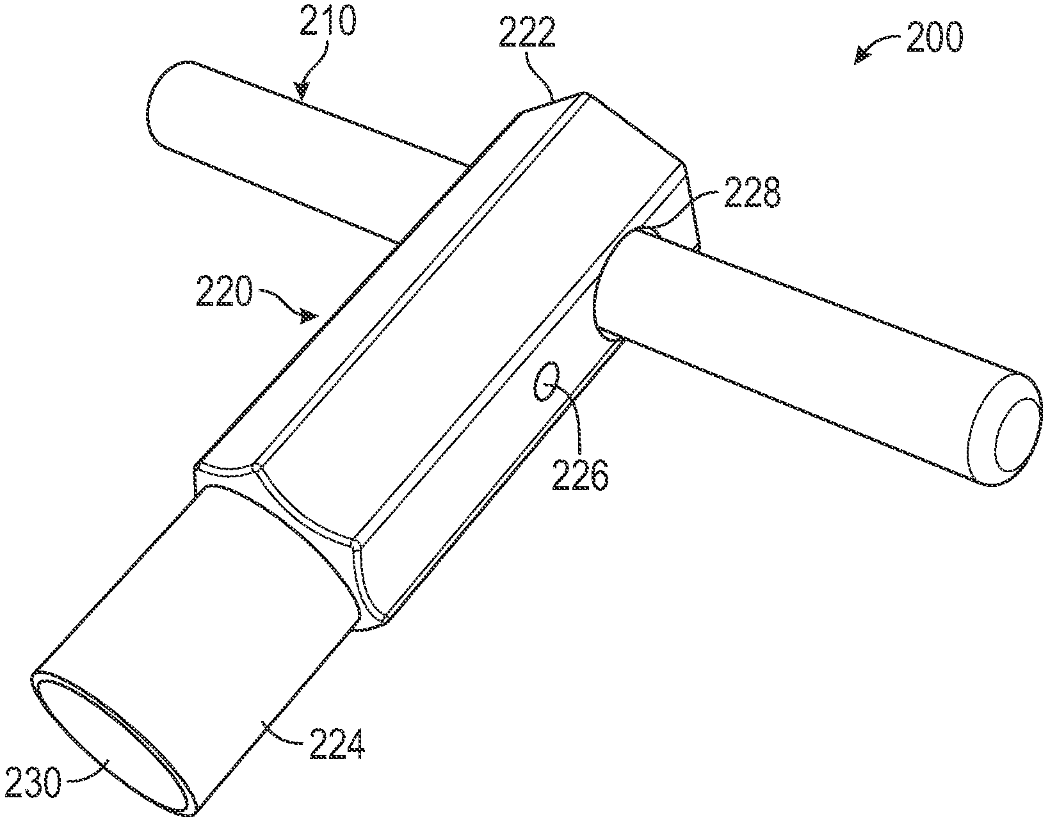
FIG. 9 is a perspective view of a drum key according to an embodiment of the present disclosure.
Figure 10:
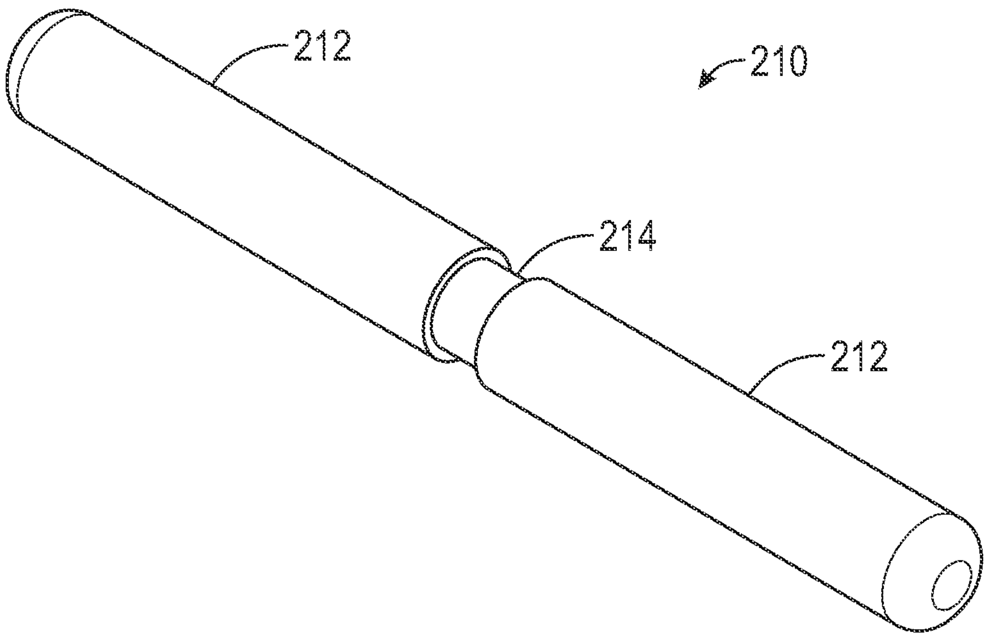
FIG. 10 is a perspective view of handle portion of the drum key of FIG. 9.
Figure 11:
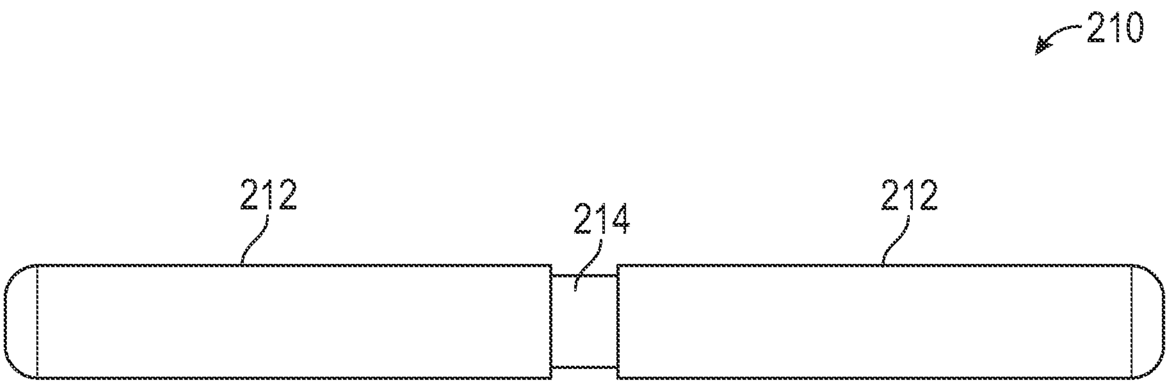
FIG. 11 is a side elevation view of the handle portion of FIG. 10.

Drum key 200 is shown in perspective in FIG. 9. Drum key 200 in one embodiment comprises handle 210 (see FIGS. 10-11) and body 220 (see FIGS. 12-15). Handle 210, shown in perspective in FIG. 10 and front elevation in FIG. 11, comprises two ends 212 that are generally round and rod-like, with a middle section 214 that is of a smaller diameter than the ends 212. The handle 210 fits into and is retained by the body 220 by way of a set screw such as that shown in FIG. 8, or another such mechanism by which the handle 210 may be secured to the body 220. Such other mechanisms will be evident to those of skill in the art, are not described further herein, but are within the scope of the disclosure. Further, while described as two pieces, the drum key may be manufactured of a single piece. Still further, while described and shown as round, the handle 210 may have a different cross section without departing from the scope of the disclosure. Additionally, the drum key may be of any number of construction methods typical to parts of this size, including but not limited to injection molding, die casting, investment casint, machining from solid stock, or the like.

Figure 13:
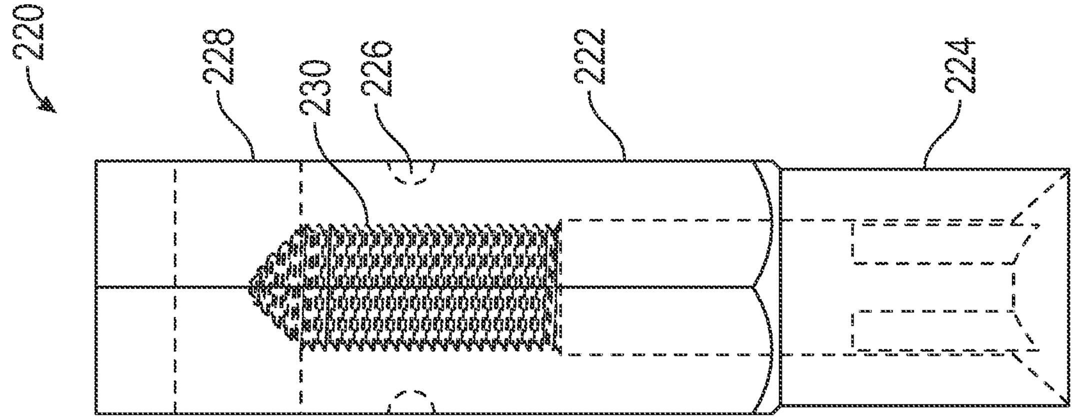
FIG. 13 is a front elevation view of the handle portion of FIG. 12, with internal components shown.
Figure 12:
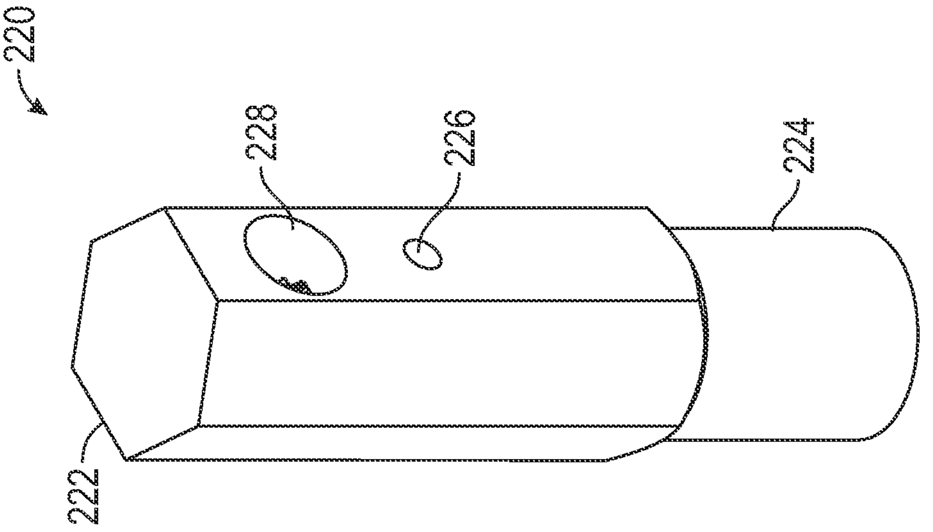
FIG. 12 is perspective view of a body portion of the drum key of FIG. 9.
Figure 15:
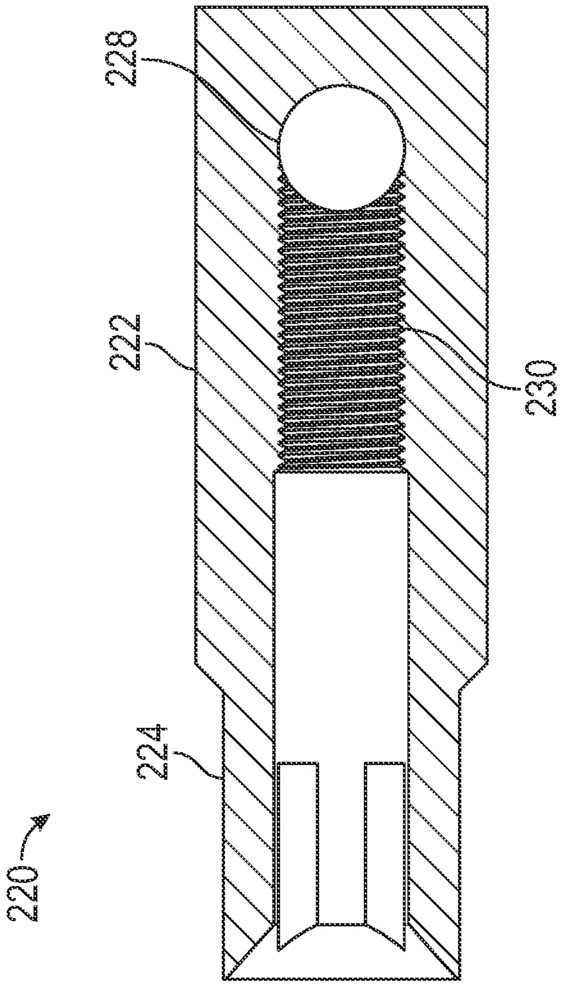
FIG. 15 is a section view of the handle portion of FIG. 9.
Figure 14:
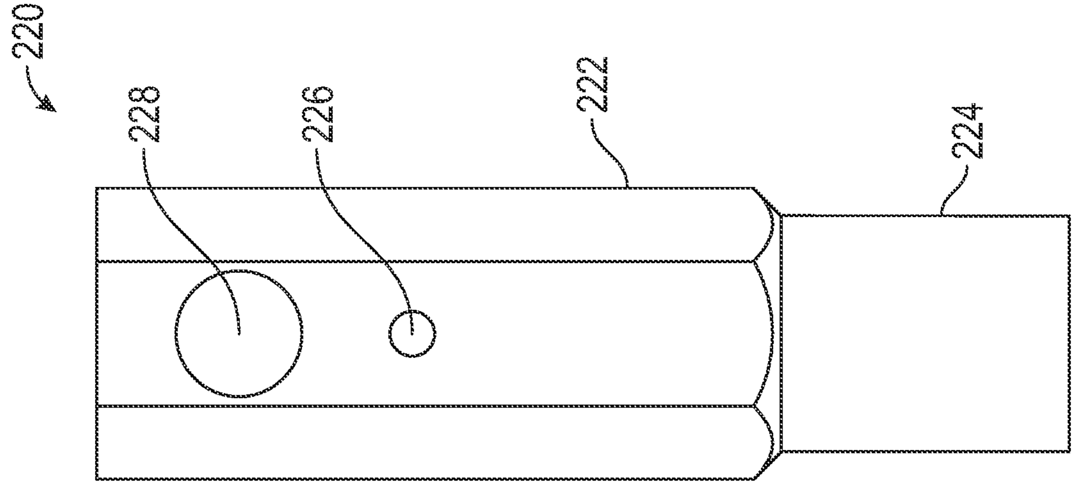
FIG. 14 is a side elevation view of the handle portion of FIG. 12.

Body 220 is shown in perspective in FIG. 12, in front elevation in FIG. 13, in side elevation in FIG. 14, and partial side cutaway in FIG. 15. Body 220 comprises in one embodiment retention portion 222 and wrench portion 224. Retention portion is shaped to fit into opening 108 of butt plate 100 to be retained therein, either alone or with assistance of a retention component such as ball plunger 120 engaging detent 226 in retention portion 222 or the like. Opening 228 receives handle 210, and handle 210 is retained within body 220 such as with a ball plunger threaded into threaded opening 230 to extend into opening 228 to engage middle section 214 of handle 210. It should be understood that different ways of attaching handle 210 to body 220 will be evident to those of skill in the art, and may be used without departing from the scope of the disclosure. Wrench portion 224 in one embodiment has an external round shape and an internal configuration suitable for bolts such as bolts 104, in known fashion.

In operation, the butt plate 100 is secured to a drum 50, and when a drum key 200 is to be retained therein, the drum key is inserted into opening 108 until the retention component engages the drum key. In one embodiment, that is the ball plunger 120 engaging the detent 226 in the drum key.

It should be understood that a threaded ball nose spring plunger 120 is shown as a retention component, it should be understood that other retention components may be used without departing from the scope of the disclosure. Other retention components include, by way of example only and not by way of limitation, an elongated groove instead of a detent 226 in the drum key 200, a spring of flat or round metal or plastic inside the butt plate that snaps into place with the key, Magnetic retention, friction fit with nylon or similar plastics, an O-ring providing friction, threads that screw the drum key into place, or the like.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A snare drum key holder, comprising:

a butt plate for a snare drum, the butt plate comprising an opening configured to accept a drum key, the butt plate configured to attach to a snare drum using existing butt plate mounting openings in the snare drum.

2. The snare drum key holder of claim 1, wherein the opening is hexagonal.

3. The snare drum key holder of claim 1, wherein the opening further comprises a retention component therein for retaining the drum key.

4. The snare drum key holder of claim 3, wherein the retention component comprises a spring ball plunger that corresponds to a groove or opening on the drum key.

5. The snare drum key holder of claim 3, wherein the retention component comprises a spring therein for engaging an opening on the drum key.

6. The snare drum key holder of claim 3, wherein the retention component comprises a magnet.

7. The snare drum key holder of claim 3, wherein the retention component comprises threads configured to receive a threaded drum key.

8. The snare drum key holder of claim 1, wherein the opening further comprises a retention component therein for retaining the drum key, and further comprising a drum key, the drum key configured to be retained in the opening.

9. The snare drum key holder of claim 8, wherein the retention component comprises a spring ball plunger that corresponds to a groove or opening on the drum key.

10. The snare drum key holder of claim 8, wherein the retention component comprises a spring therein for engaging an opening on the drum key.

11. The snare drum key holder of claim 8, wherein the retention component comprises a magnet.

12. The snare drum key holder of claim 8, wherein the retention component comprises threads configured to receive a threaded snare drum key.

13. The snare drum key holder of claim 8, wherein the drum key comprises:

a handle; and a body;

wherein the body comprises a shape configured to fit the opening, a wrench component for adjusting bolts of the snare drum, and a detent configured to engage the retention component of the butt plate to secure the snare drum key to the butt plate.

14. A butt plate for a snare drum, the butt plate comprising:

a body having a plurality of mounting openings therein, the mounting openings comprising a set of openings configured to match mounting openings in the snare drum; and an opening in the body, the opening configured to accept and retain a snare drum key.

15. The butt plate of claim 14, wherein the opening is hexagonal.

16. The butt plate of claim 14, wherein the opening further comprises a retention component therein for retaining the snare drum key.

17. The butt plate of claim 16, wherein the retention component comprises a spring ball plunger that corresponds to a groove or opening on the drum key.

18. The butt plate of claim 16, wherein the retention component comprises one of a spring therein for engaging an opening on the drum key a magnet, or threads configured to receive a threaded snare drum key.

19. A snare drum key, comprising:

a handle; and a body;

wherein the body comprises a shape configured to fit an opening of a butt plate securable to a snare drum, a wrench component for adjusting bolts of a snare drum, and a detent configured to engage a retention component of the butt plate to secure the snare drum key to the butt plate.

20. The snare drum key of claim 19, wherein the body is hexagonal in shape.

* * * * *